Aug. 11, 1936.   H. McCORNACK   2,050,356
PROCESS OF MILKING
Original Filed Nov. 22, 1923
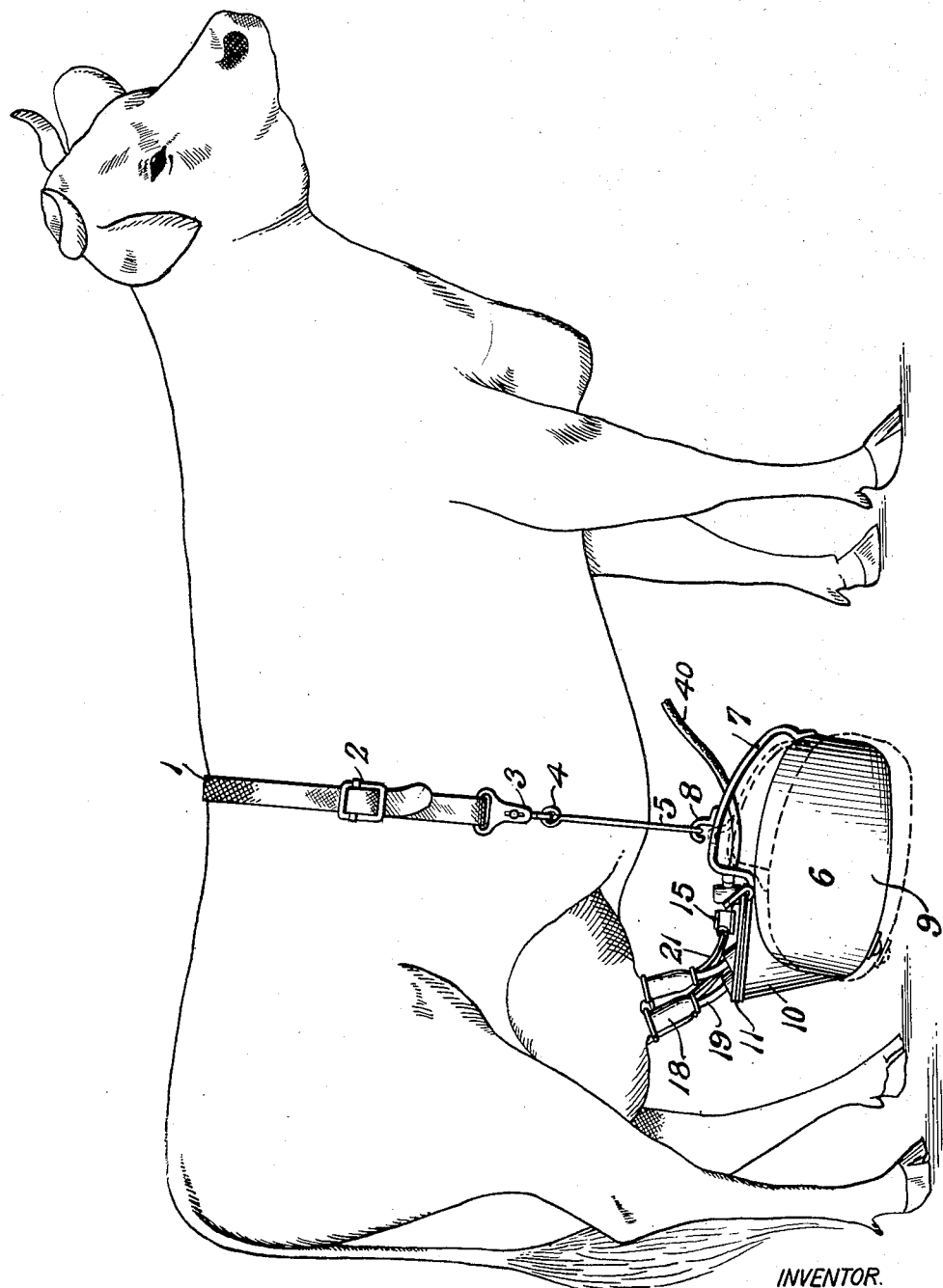
INVENTOR.
Herbert McCornack.
BY Moses + Nolte
ATTORNEYS.

Patented Aug. 11, 1936

2,050,356

UNITED STATES PATENT OFFICE 2,050,356

PROCESS OF MILKING

Herbert McCornack, Glen Ridge, N. J.

Original application November 22, 1923, Serial No. 676,241. Divided and this application April 10, 1931, Serial No. 529,273

5 Claims. (Cl. 31—87)

This invention relates to a method of milking, and more particularly to a method of mechanical milking, as distinguished from hand milking.

It is an object of the invention to devise a method whereby the secretion and flow of milk are stimulated and udder congestion is prevented and reduced.

To this end it is a feature of the invention that the udder is agitated during milking by exerting an intermittent tug upon the teats.

The fundamentally important characteristic of my milking method which differentiates it from former milker practice is the use of a member, having substantial weight, supported partly by the cow's udder and partly from a point on the cow's body in advance of the udder, which is oscillated and is thereby caused to exert a tugging action upon the cow's teats and udder.

This method of milking makes it impossible for the teat cups to be drawn up by suction against the cow's udder and has remedied the most serious fait in mechanical milking; namely, interference with the milk flow and the strangulation of the blood circulation.

Prior machines, not only lack that agitation which is the calf's appeal to his mother for more milk but, what is more serious, since these machines offer no adequate live resistance to the upward pull of the vacuum, the teat cups of prior machines, as the milking progresses and the udder slackens, are sucked up against the udder and thus interfere with the flow of the milk and the circulation of the blood. It is practice, in view of these limitations of prior machines, for the operator, as the udder slackens, to pull downward occasionally upon the teat cups in order to release their strangle-hold upon the teats and udder and to thus start the milk flowing again.

The pull and the tug and the resulting calf-like agitation, which is brought to mechanical milking by this new milking method, stirs up the mammary glands of the cow and stimulates the secretion of the milk, and, what is vitally important to the health of the udder and to the wholesomeness of the milk, this action, by stimulating the circulation of the blood, also prevents and reduces udder congestion.

It is a further feature of the invention that the downward and forward pull exerted upon the udder during milking is increased as the milking proceeds.

A further important feature of the invention has to do with the individual inspection and hand stripping of the several teats. The attendant, when he believes that the milking of the cow is nearly complete, may examine and strip the teats individually while the apparatus remains attached to the other teats and by its intermittent tugging effect agitates the udder. The stimulating effect of this agitation has a beneficial effect in enabling the hand stripping to be more thoroughly accomplished than by previously known methods.

Another feature of this new method of milking is that it makes it possible for the operator to manipulate the udder while the teats either jointly or separately are, at the same time, being milked under this tugging action of the machine. This is particularly useful with a refractory cow or a cow that has an abnormal udder.

The invention is illustrated herein as practiced by apparatus as disclosed in my pending application Serial No. 676,241, filed November 22, 1923, for Apparatus for milking which has matured into Patent Number 1, 859,213, dated May 17, 1932, of which application the present application is a division. The process is not, however, limited to the particular apparatus disclosed, but is capable of being practiced by other apparatus or by apparatus in conjunction with manual operations.

In the drawing forming part of this specification, the figure shows a perspective view of a cow with a milker unit applied.

As illustrated in the drawing, a bucket 6 is suspended beneath the cow by any suitable means, as, for example, a strap or surcingle 1 extending over the back of the cow and positioned on the back a little forward of the udder so as to pull the bucket toward the head of the cow. The surcingle 1 is provided with an adjustable buckle 2 whereby it may be adjusted to the different cows and for the desired position of the bucket, and it carries a snap 3 by which the end 4 of the bow 5 may be detachably supported.

The bucket 6 has a handle 7 with a hook 8 which hooks over the bow 5 to support the bucket thereon. In attaching the bucket to the bow the bow may be pulled to the side of the cow and the hook 8 hooked over the same, whereupon the bucket when released will slide to the lowest part of the bow where it is suspended in proper position for milking substantially beneath the center of the cow's body. The bucket comprises a body part 9 and an enlarged spout 10 closed by a lid 11 which carries teat cup nozzles. The lid 11 also carries a pulsator 15 which communicates through a tube 40 with a source of vacuum and through tubes 21 with the outer chambers of double chambered teat cups. The inflations of said teat cups are connected through short, flexible, rubber hoses 19 with the nozzles carried by the bucket lid. The tube 40 communicates with the interior of the bucket through the pulsator body, but independently of the pulsation producing mechanism of the pulsator, to maintain a steady vacuum in the bucket.

The point of suspension of the bucket is located above and in advance of the center of gravity of the bucket when the latter is operatively supported and connected, so that a portion of the weight of the bucket is applied to the teats and the udder during milking.

For a more complete disclosure of the actual construction of the mechanism disclosed, reference may be had to my pending application above referred to.

It will be understood that the inner chambers of the teat cups in which the teats are inserted are subject to a continuous vacuum, while the outer chambers are alternately subjected to vacuum and atmospheric pressure to cause the inner walls of the teat cups to expand and contract in the usual manner.

In the operation of the machine the surcingle 1 is adjusted to the cow to be milked, and the bucket 6 is hooked over the bow 5. The hook 8 provides a swivel mounting for the bucket 6 upon the bow 5 so that the bucket may turn to adjust itself in accordance with the length and disposition of the teats and the conformation of the cow's udder. The teat cups 18 are applied to the teats, and the vacuum existing in the bucket applies suction immediately to the teats to draw them the proper distance into the cups and start the milking. At the same time the pulsator 15 causes alternate periods of suction and atmospheric pressure in the outer chambers of the teat cups which causes the walls thereof to expand and contract upon the teats. The intermittent pulsations of the pressure in the outer chamber of the teat cups cause the bucket 6 to start swinging back and forth to exert an intermittent pull or tug upon the teats through the tubes 19 and the teat cups 18, and this induces the cow to give down her milk more rapidly than with machines as heretofore operated. As the milk accumulates in the pail the swinging movement of the pail is communicated to the milk so that it surges back and forth as the pail swings, and acts to modify the swinging.

The accumulation of milk increases the weight of the suspension unit and causes the surcingle support to be extended so that the pail hangs a little lower, as illustrated by the dotted line position of the pail in the figure. Thus a greater pull is exerted upon the teats toward the end of the milking operation, both because of the increase in the weight applied directly to them irrespective of the changed position of the bucket, and because of the increase in the weight applied to them as a result of the change in position of the bucket. As a result of the agitation of the udder and of the increasing weight applied to the udder, the cow is caused to be effectively stripped of her milk, so that hand stripping after the milking machine is removed from the teats may be dispensed with. The yield of milk is increased and at the same time the labor of the attendant is conserved.

The agitation of the udder has the further advantage that the cow is caused to give down her milk more rapidly, so that the machine milks faster and can be operated on a lower vacuum than the prior machines, thus contributing both to the speed of milking and to the safety of operation.

While the method of milking has been described with reference to a particular milking apparatus employing a suspended bucket and means automatically oscillating the bucket to agitate the udder, it is to be understood that the method is not limited to the illustrative apparatus and that it may be carried out by the suspension of a dead weight (not the bucket) from the udder and the automatic oscillation of such weight.

While I have described herein a preferred method of practicing the invention and I have illustrated preferred mechanism for the practice of such method, it is to be understood that the method and apparatus may be modified in many respects without departing from the spirit of the invention, and that it is my intention to cover all such modifications of the method in the appended claims. The method described and claimed may be carried out by other apparatus, without departing from the scope of the method claims which are intended to cover the steps of the method regardless of the apparatus used.

I claim:

1. The process of milking, which comprises applying suction to a plurality of the animal's teats, applying a forward and downward pull to the udder through the cups, increasing the pull as the milking progresses, and periodically relieving the pull throughout the milking operation to produce a substantially continuous agitation of the udder.

2. The method of milking, which comprises applying suction to a teat of the animal, providing a connecting element between the teat and a point on the animal's body in advance of the udder, and agitating the udder by exerting variable force through said element to apply an intermittent forward and downward tug to the teat.

3. The process of milking which comprises applying weight to a plurality of the teats, applying suction to said teats through individual teat cups, agitating the udder substantially continuously by operating the weight periodically toward and from the head of the animal and completing the process of milking the cow by hand while she is being milked under the forward surging influence of the weighted member.

4. The process of milking which comprises applying a weight to a plurality of the teats, applying suction to said teats through individual teat cups, agitating the udder substantially continuously by operating the weight toward and from the head of the animal, and separately inspecting and hand stripping each teat into its own cup while the remaining teats are being milked under the tugging action of the weighted member.

5. The process of milking which comprises applying a weight to a plurality of the teats, applying suction to said teats through individual teat cups, agitating the udder substantially continuously by operating the weight toward and from the head of the animal and manipulating the udder while the teats either jointly or separately are at the same time being milked under the tugging action of the weighted member.

HERBERT McCORNACK.